(12) United States Patent
Spratt

(10) Patent No.: US 7,027,820 B2
(45) Date of Patent: Apr. 11, 2006

(54) LOCATION DATA VALIDATION BY STATIC ENTITIES RECEIVING LOCATION DATA ITEMS BY SHORT-RANGE COMMUNICATION

(75) Inventor: Michael P Spratt, Weston Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 10/057,741

(22) Filed: Jan. 23, 2002

(65) Prior Publication Data

US 2002/0163901 A1 Nov. 7, 2002

(30) Foreign Application Priority Data

Jan. 31, 2001 (GB) .................................... 0102417
Jul. 20, 2001 (GB) .................................... 0117702

(51) Int. Cl.
*H04Q 7/20* (2006.01)

(52) U.S. Cl. ............................. 455/456.1; 455/456.6; 455/41.2

(58) Field of Classification Search ............. 455/456.1, 455/456.2, 456.3, 456.4, 456.5, 456.6, 556.1, 455/557, 41.2, 550.1
See application file for complete search history.

(56) References Cited

U.S. PATENT DOCUMENTS

| | | | |
|---|---|---|---|
| 5,375,161 A | 12/1994 | Fuller et al. .................. 379/57 |
| 5,748,147 A | 5/1998 | Bickley et al. ............. 342/457 |
| 5,787,359 A | 7/1998 | Nagata ........................ 455/517 |
| 5,850,609 A * | 12/1998 | Sugarbroad et al. ..... 455/456.1 |
| 5,875,400 A | 2/1999 | Madhavapeddy et al. ... 455/458 |
| 5,987,011 A | 11/1999 | Toh ............................ 370/331 |
| 5,990,833 A | 11/1999 | Ahlbom et al. ............. 342/417 |
| 6,047,183 A | 4/2000 | Kingdon et al. ............ 455/440 |
| 6,078,826 A | 6/2000 | Croft et al. .................. 455/574 |
| 6,104,712 A | 8/2000 | Robert et al. ............... 370/389 |
| 6,130,881 A | 10/2000 | Stiller et al. ................ 370/238 |
| 6,212,133 B1 | 4/2001 | McCoy et al. ................. 368/9 |
| 6,236,335 B1 | 5/2001 | Goodwin, III ......... 340/825.49 |
| 6,313,786 B1 | 11/2001 | Sheynblatt et al. .... 342/357.02 |
| 6,411,891 B1 | 6/2002 | Jones ......................... 701/201 |
| 6,473,031 B1 * | 10/2002 | Harris ...................... 455/456.1 |
| 6,492,944 B1 * | 12/2002 | Stilp .......................... 342/387 |
| 6,549,625 B1 | 4/2003 | Rautila et al. .............. 380/258 |
| 6,704,283 B1 | 3/2004 | Stiller et al. ................ 370/238 |
| 6,725,051 B1 * | 4/2004 | Fidler ....................... 455/456.1 |
| 2002/0119788 A1 * | 8/2002 | Parupudi et al. ............ 455/456 |

FOREIGN PATENT DOCUMENTS

EP 0 913 965 A1 5/1999

(Continued)

OTHER PUBLICATIONS

Cochrane, P., "The Market Impact of Fundamental Technology," 9 pages (Jun. 2000).

(Continued)

*Primary Examiner*—Joseph Feild
*Assistant Examiner*—Huy D. Nguyen

(57) ABSTRACT

A static but movable device has a short-range wireless transceiver by which it can receive location data items. These items are usable by a location-data processing arrangement of the device to derive an estimate of the current location of the device. If the device is moved to another location, this estimate will cease to be valid. Accordingly, the device is provided with a move detection arrangement for detecting indications that the device may have been moved, these indications being used by a location-validity supervisor to determine whether or not the current location estimate is to be treated as still valid.

13 Claims, 4 Drawing Sheets

FOREIGN PATENT DOCUMENTS

| | | |
|---|---|---|
| EP | 0 948 222 A2 | 10/1999 |
| EP | 1 133 115 A2 | 9/2001 |
| GB | 2 338 374 A | 12/1999 |
| GB | 2 339 356 | 1/2000 |
| GB | 2 342 018 A | 3/2000 |
| GB | 2 344 723 A | 6/2000 |
| GB | 2 360 914 A | 10/2001 |
| GB | 2 364 203 A | 1/2002 |
| WO | 98/12862 | 3/1998 |
| WO | 99/46899 | 9/1999 |
| WO | 00/23816 | 4/2000 |
| WO | 01/50151 A1 | 7/2001 |
| WO | 01/63316 | 8/2001 |

OTHER PUBLICATIONS

U.S. Appl. No. 09/905,774, filed Jul. 13, 2001, Spratt.
U.S. Appl. No. 09/905,775, filed Jul. 13, 2001, Spratt.
U.S. Appl. No. 10/057,742, filed Jan. 23, 2002, Spratt.
Bandyopadhyay, S., et al., "Using Mobile Agents for Off-Line Communication Among Mobile Hosts in a Large, Highly-Mobile Dynamic Networks," *IEEE International Conference on Personal Wireless Communications Proceedings*, pp. 88-92 (Feb. 17, 1999).

\* cited by examiner

LOCATION DATA VALIDATION BY STATIC ENTITIES RECEIVING LOCATION DATA ITEMS BY SHORT-RANGE COMMUNICATION

CROSS REFERENCE TO RELATED APPLICATIONS

The subject matter of the present application may also be related to the following U.S. Patent Applications: "Location Data Diffusion and Location Discovery," Ser. No. 09/905,774, filed Jul. 13, 2001; "Message Passing to a Known Location," Ser. No. 09/905,775, filed Jul. 13, 2001; and "Location Data Dissemination and Reception for Entities Having Short-Range Receivers," Ser. No. 10/057,742, filed Jan. 23, 2002.

FIELD OF THE INVENTION

The present invention relates to location data validation by static entities that are arranged to receive location data items by short-range communication.

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

FIG. 1 of the accompanying drawings depicts an information diffusion process in which an originating information point 10 (typically fixed, but not necessarily so) sends out the information over a short-range radio link to nearby mobile devices, in this case device 11. The receiving device 11 transmits on the information to a neighboring device 12 and then moves (see dashed arrow in FIG. 1) before sending on the information again to another device 14. Meanwhile mobile device 12 has moved into proximity with device 13 to which it also transmit the information. Device 13 now moves near to the device 14 and passes the latter the information—however, as device 14 already has the information from device 11, it ignores the copy from device 13. Device 13 also passes the information to a fixed relay transceiver which subsequently passes the information to a mobile device 15. Finally, device 15 passes the information to device 14 which has now within range of device 15; again, device 14 ignores the copy information from device 15.

It can be seen that information can be rapidly diffused among the population of mobile-device users in the general vicinity of the source 10.

By applying appropriate diffusion-limiting mechanisms (for example, by assigning the original information a total time to live of, for example, 10 minutes), the information can be restricted to the vicinity of the originating point 10. This makes the diffusion process appropriate for the diffusion of location relevant information that is primarily of use only in the vicinity of point 10.

The diffused information can, of course, include the location of the originating point. For devices receiving the information directly from the originating point, this provides them with a fairly accurate indication of their location (because the information is received over a short-range link). However, as the information is diffused between devices, the newly-receiving devices get less and less accurate location information.

Our co-pending European Application 01301826.2 describes a method by which an entity receiving location data by diffusion from several different sources, can use this data to estimate its current position in dependence on the relative prominence of the sources amongst the set of most recently received location data items.

Our co-pending European Application EP 01305936.5 describes another method by which an entity can discover its location using multiple items of location data received by short-range diffusion from several sources. In this method, each location data item includes an indication of the distance traveled by the location data item from its source, either by displacement of entities temporarily holding the item or by transmission. This distance represents an upper bound on the current distance of a receiving entity from the source concerned and this can be used, together with upper-bound distances from other sources, to discover a current zone where the entity is likely to be located; various averaging techniques can then be applied to derive a current location for the entity.

FIG. 2 shows the main elements of a generalized entity 20 for effecting location determination in accordance with the method disclosed in the aforesaid EP 01305936.5 Specific implementations of the generalized entity include a vehicle-based implementation, a pedestrian-based implementation, and a static-device based implementation. In the case of the vehicle-based implementation, the functional elements can be built into the vehicle whereas in the case of the pedestrian-based implementation, the elements will generally be provided in the form of a mobile device carried by the pedestrian. Not all of the illustrated elements are required in all implementations—for example, for static devices, distance unit 25 (to be described below) is not required. Similarly, the functionality provided by data handling subsystem 22 will generally differ between implementations as may the types of data stored.

The functional elements of the entity 20 comprise:
  a short-range wireless transceiver subsystem 21 (for example, infrared-based or, preferably, radio-based such as a Bluetooth system) for receiving and (preferably) transmitting location data items 27 from/to nearby entities of similar form;
  a data-handling subsystem 22 for handling and maintaining the location data items 27 and effecting location determinations;

a memory 23 for storing map data 23 and location data items 27 received via the wireless subsystem 21 and the data-handling subsystem 22;

a user interface 24 for displaying a map-based indication of location to the user; and a distance unit 25 for providing to the data-handling subsystem 22, in cases where the entity 20 is a mobile entity, a measure of incremental distance traveled by the entity.

The data-handling subsystem runs four main processes, these being a process 26A for receiving, updating and storing location data items; a process 26B for controlling the onward transmission of location data items whenever the wireless subsystem 21 determines that there is another entity close by; a process 26C (only required for mobile entities) for updating the stored location data items to take account of the incremental distance traveled by the entity according to the distance unit 25; and a process 26D for effecting location determination based on the received location data items (and possibly also the map data held in memory 23), and for outputting the results of the determination to user interface 24.

Each location data item comprises two main fields 27A and 27B. Field 27A holds an identifier specifying a known location, either as a label which can be used to look up the location (for example, using the map data held in memory 23), or directly as location coordinates for the location. Field 27B holds a distance quantity which, as will be more fully explained below, represents the displacement of the location data item since leaving its point of origin and thus corresponds to the maximum distance to the known location identified by field 27A. The location data item may also include an age field 27C indicating the age (or time to live) of the location data item. Each location data item originates from a short-range transmission source located at the known location specified in the data item. Such a source that always broadcasts accurate location data (generally because it is permanently fixed in one place the location of which is known) is known as a location beacon.

Each location data item may be transmitted as the sole content of a message or may be included with other message content such as location-dependent information 97.

The distance quantity held in field 27B is arranged to be updated by the entities 20 handling the item to take account of the displacement of the item from its source. This displacement can be either as a result of movement of an entity that is temporarily holding the item or as a result of a transmission hop between entities. Whether updating of the field 27B is done to take account of one or both types of item displacement will generally depend on the nature of the entity concerned. Thus, mobile entities will generally be arranged to update the location data items they hold for item displacement due to entity movement, this being the function of distance unit 25 and process 26C; mobile entities may or may not also update location data items to take account of transmission hops depending on whether such hops are likely to contribute significantly to overall item displacement (this is potentially the case for pedestrian-based entities but unlikely for vehicle-based entities), such updating, if effected being part of process 26A. Static entities will generally only update location data items in respect of transmission hops.

As regards the distance unit 25 provided in respect of mobile entities, where the mobile entity is vehicle based (see vehicle 28), the unit 25 can conveniently be constituted by the vehicle's existing odometer; for pedestrian-based implementations (see pedestrian 29), the distance unit 25 is preferably a process run by the data handling subsystem 22 to provide an estimate of distance travelled based on the product of elapsed time (since last update or message receipt) and a maximum speed value set or measured for the pedestrian; a motion detector is preferably provided to limit the elapsed time value to periods when the pedestrian is in motion.

As already indicated, the purpose of the update process 26C is to use the output of the distance unit 25 to update the distance quantity held in field 27B of each location data item by adding to it the incremental distance travelled by the mobile entity since the last update or, for newly received items, since received. Whilst it is only necessary to update the distance quantities held in fields 27B immediately prior to the data items either being used in the location determination process 26D or being onwardly transmitted, in practice it may be more convenient to continuously update the distance quantities.

With respect to updating the distance quantity of a location data item to take account of the transmission hops between entities taking part in diffusion of the item, this can be done by increasing the value of the distance quantity 27B by a transceiver range value each time the item is transmitted. Increasing the distance quantity in this way can be effected either in the transmitting entity immediately prior to transmission or in the receiving entity upon receipt (for example, as part of process 26A). Since, of course, the range of the transmitting entity is a function not only of the transceiver of the transmitter but also of the sensitivity of the transceiver of the receiving entity, the range value added to the distance quantity 27B should be for standard receiving conditions. If this range value is added at each hop from entity to entity, the distance quantity 27B will be increased by the sum of the ranges of the participating entities. In fact, where all entities have approximately the same range, a simple implementation for taking account of the transmission hops would be to include a hop count in each location data item (as the distance quantity or a component of it); a receiving entity could then multiply this hop count by a range value to derive the actual distance quantity component arising from transmission hops.

The foregoing consideration of adding transmission hop values to the distance quantity 27B, effectively assumes that all entities will be receiving at the maximum range, which is unlikely to be the case. By separately specifying the range of the transmitting entity in the transmitted message (and not including it in the transmitted the distance quantity 27B), the receiving entity can choose whether to add the full range value to the received distance quantity 27B or whether only a percentage amount should be added because the receiving entity believes itself not to be at the maximum range from the transmitting entity. Such a belief can be derived from the received signal strength, a strong signal indicating that the transmitting entity is closer than if a weak signal is received. Of course, the transmitting entity can automatically add 100% of its range to the distance quantity 27B when transmitting, the receiving entity then being responsible for subtracting an appropriate percentage of the transmitting entity's range (this range value still being included in the transmitted message).

As already mentioned, to derive an estimate of the current location of entity 20, the distance quantity of each location data item 27 held by the entity is treated as providing an upper bound on the distance of the entity from the known location identified in the data item (the distance quantity is an upper bound because some of the distance travelled by the item may not have been away from the source). The entity then derives its location by determining a location simultaneously consistent, or most nearly consistent, with the upper bound values it knows of as a result of location data items it has received. In carrying out this derivation, the entity may apply one or more route constraints for how the location data items passed to the mobile entity (for example, where the entity is a vehicle, the upper bound distances are taken as being distances along roads). Of course, the upper bound distances of currently-held location data items are likely to delimit a zone where the entity is probably located rather than a single point; accordingly, the location derivation process can be arranged to effect a best estimate of location within this zone based, for example, on an averaging relative to vertices of the zone.

The foregoing location derivation process may require substantial processing resources, a simplified location estimation method can be employed in which the entity 20 derives its location from location data items it has received by effecting a weighted combination of the known locations specified in the received location data items, the weighting of the known location specified in each received location data item being dependent on the associated displacement value. In particular, the weighting of the known location specified in each received location data item can be inversely related to the associated displacement value or to the square of this value. This approach to location estimation is based upon the observation that the further away a location data item is from where it was sourced, the less important it is likely to be in the location derivation process.

In an alternative simplified estimation method, a weighted combination of the known locations specified in the received location data items can be effected in dependence on the age of the items (in this case, the location data items do not, in fact, need to include the displacement values 27B).

The present invention is particularly concerned with static and semi-static devices equipped with short-range transceivers and functionality for effecting location estimates based on received location data items. Typical devices of this type are items of office equipment such as desktop PCs, printers and copiers. Because these devices will generally stay in one place for extended periods and therefore have the opportunity to refine their location estimates, these devices, even though they are not location beacons, can play an important role in establishing a framework of reliable location references for use by mobile devices in the same environment. However, these static devices will generally not be equipped to measure or estimate their displacement when moved with the result that upon one of the devices being moved, a significant risk arises of false location data being output (either to a user or to another device) until the static device has accurately re-established its location.

It is an object of the present invention to reduce the possibility of false location data being output by a static device that is moved.

SUMMARY OF THE INVENTION

According to one aspect of the present invention, there is provided a static but movable device comprising:
   a short-range wireless receiver;
   a location-data processing arrangement for deriving an estimate of the current location of the device on the basis of location data received by the short-range receiver;
   a move detection arrangement for detecting indications that the device at least may have been moved, and
   a location-validity supervisor for determining, following detection of one or more indications by the move detection arrangement, whether the current location estimate is to be treated as still valid.

According to another aspect of the present invention, there is provided a method of providing a validity-checked location estimate for a static, but movable, device, the method comprising the steps of:
(a)—deriving an estimate of the current location of the device on the basis of location data received by a short-range receiver of the device;
(b)—detecting indications that the device at least may have been moved, and
(c)—determining, following detection of one or more indications by the move detection arrangement, whether the current location estimate is to be treated as still valid.

According to a further aspect of the present invention, there is provided a static but movable device comprising location means for receiving location data passed to it from nearby devices and for deriving a best estimate of its own location from the received location data, and watch means for watching for an indication that the device has been, or may have been moved, and for causing the location means to discard its previously-obtained location data and location estimate.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
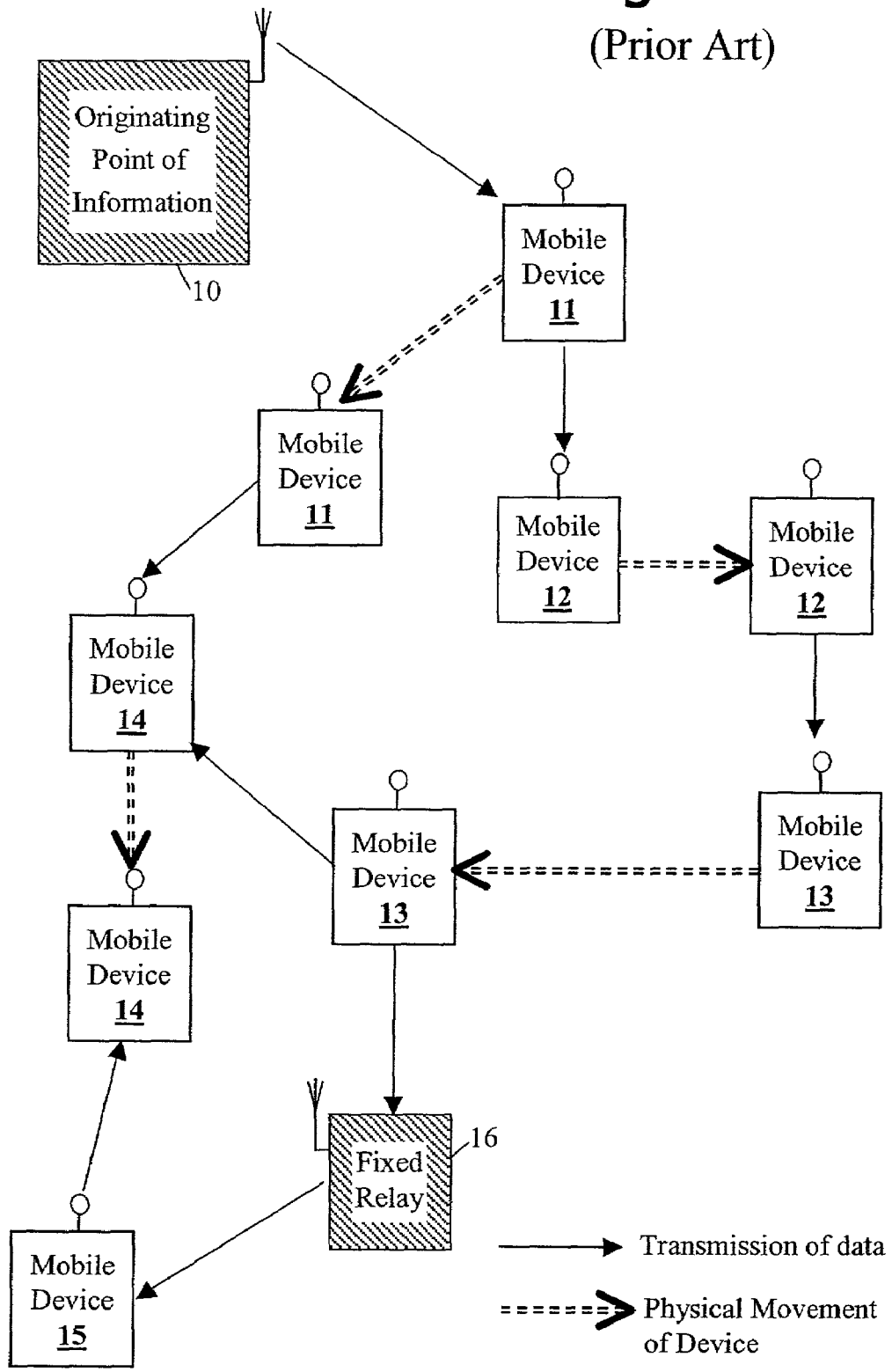
FIG. 1 is a diagram illustrating a known information diffusion technique.
Figure 2:
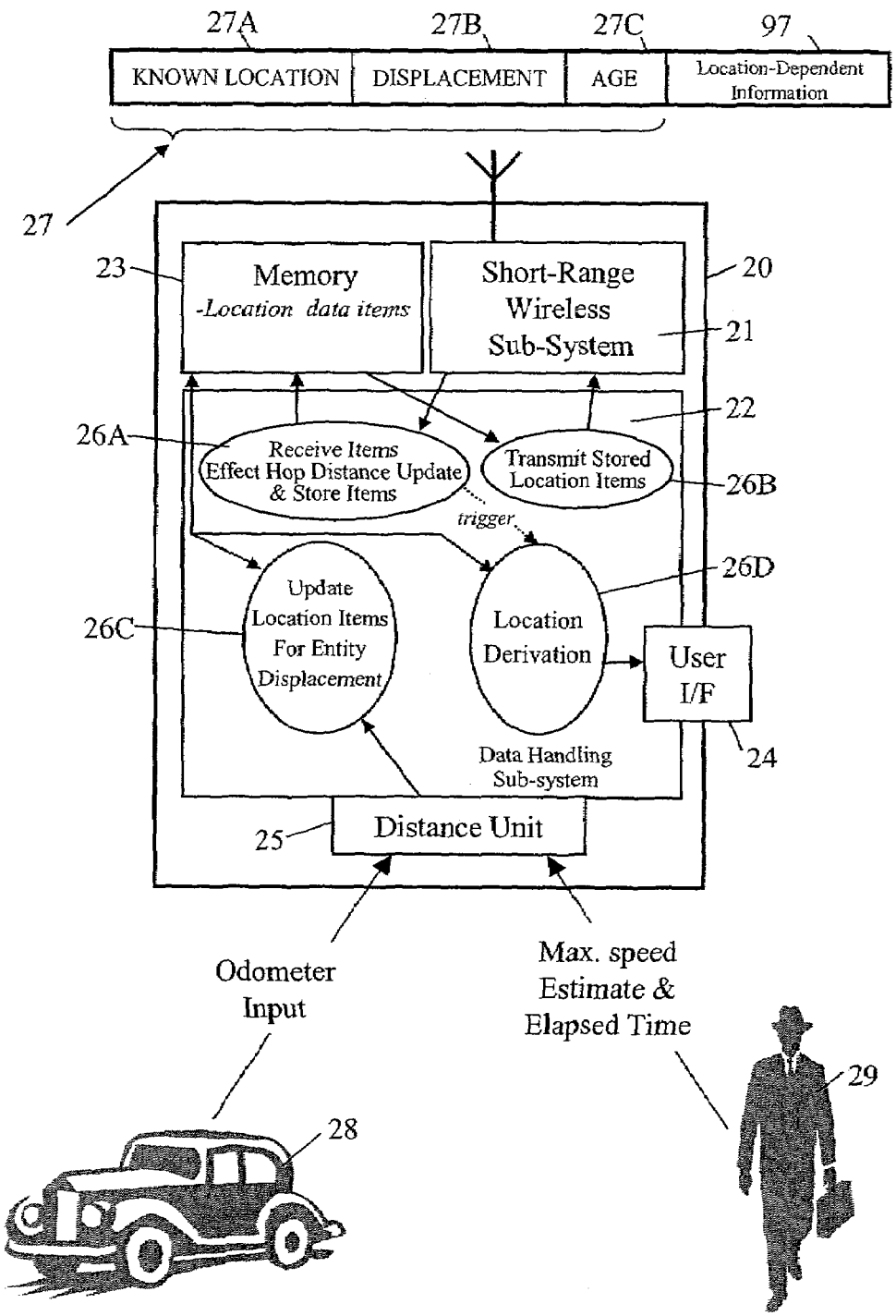
FIG. 2 is a diagram illustrating the main elements of a generalised short-range communication entity capable of deriving an estimate of its current location from received location data.
Figure 3:
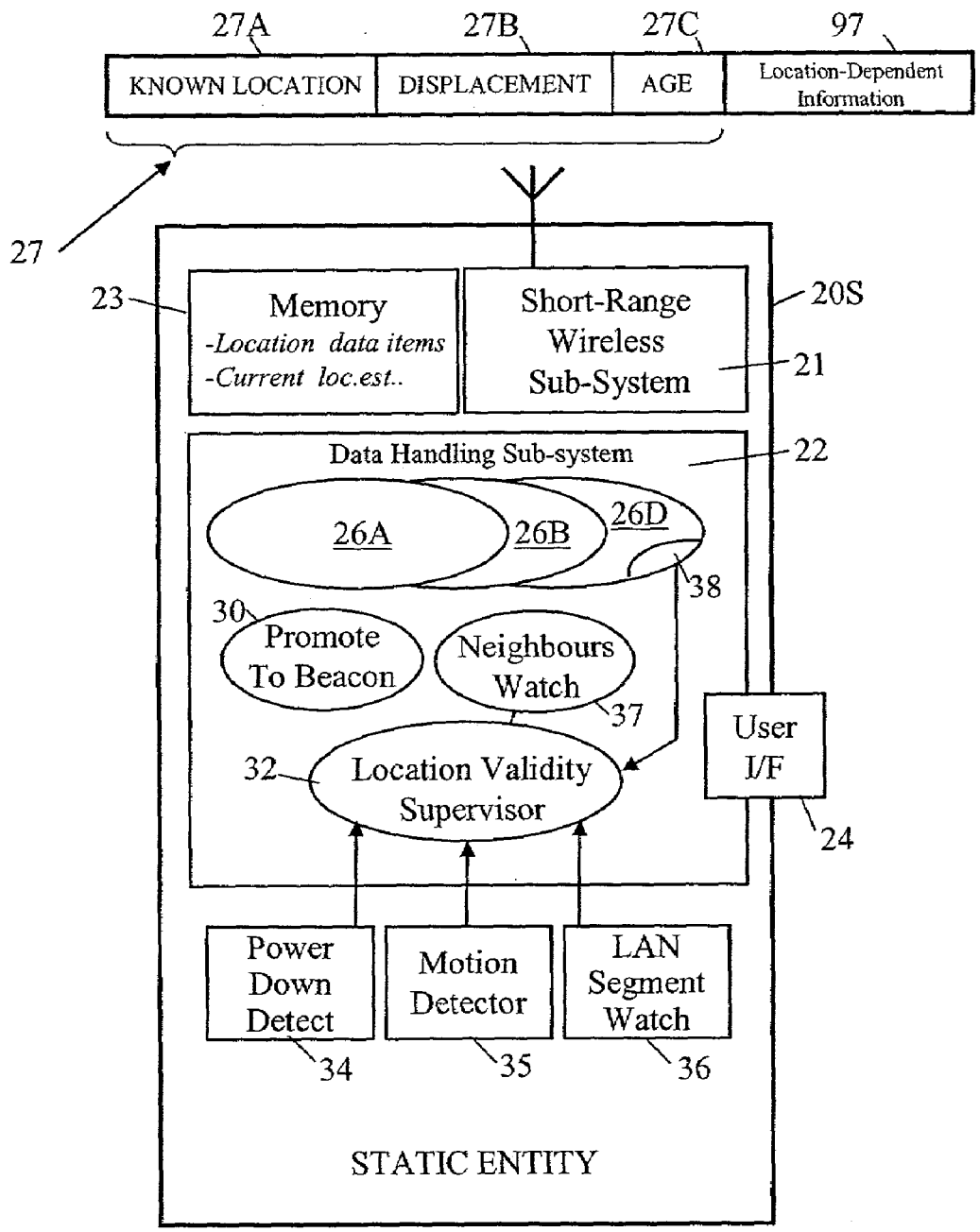
FIG. 3 is a diagram illustrating a static short-range communication entity embodying the invention.

FIG. 3 shows an implementation of the FIG. 2 generalized entity as a static but movable entity 20S. The FIG. 3 entity 20S is, for example, incorporated into an item of movable office equipment such as a PC, printer or copier.

Because the entity 20S is static, it does not contain a distance unit 25 or run the update process 25 described above for the FIG. 2 entity.

Assuming there are fixed location beacons in the environment (but not necessarily in immediate range of the static entity 20S), then over a period of time the static entity 20S will accumulate a substantial amount of location data from passing mobile entities and process 26D is therefore able to derive a fairly accurate estimate of its location. In the present case, the entity 20S is provided with additional functionality, in the form of process run by data-handling subsystem 22, that monitors successive location estimates and upon these becoming stable, promotes the entity to "beacon status". This promotion serves to transit the entity from a state 40 (see state diagram of FIG. 4) in which it passes on received location data items 27 each with their own associated displacement value in field 27B, to a "beacon status" state 41 in which it acts like a location beacon and passes on a location data item containing the entity's estimate of its location with a zero value (or a one transmission hop value) in field 27B.

The FIG. 3 entity is further enhanced with location-validity checking functionality for detecting indications that the entity may have been moved and for deciding on the basis of such indications whether the most recent location estimate is to be treated as valid or invalid.

More particularly, the move detection part of this location-validity checking functionality can be arranged to detect indications that the device at least may have been moved in one or more of the following ways::

A—by detecting an indication that the entity has been powered down and then powered back up as will generally be the case when moving the entity (this is done by block 34 in FIG. 3 and suitable implementations will be apparent to persons skilled in the art).

B—by directly detecting an indication of motion of an entity (such as by using tilt sensors or other displacement sensors, generally depicted by block 35 in FIG. 3). It may be noted that unless the entity is arranged to have these sensors, which are typically electrical/electronic in nature, always powered up even when the entity has apparently been turned off to move it, it will be necessary to use sensors with some form of mechanical or magnetic memory.

C—where the entity 20S is connected to a LAN through an associated network interface, by detecting any change in LAN segment (sub-network) address (block 36 in FIG. 3).

D—by detecting changes (or major changes) in the set of other entities which the entity concerned can contact via its short range-transceiver (whilst this set of entities may be expected to change continually as mobile entities pass into and out of range, there will generally be other static devices within range that have a more permanent presence so that the disappearance of two or more such devices substantially at the same time is likely to indicate that the subject entity has been moved). To this end, a 'neighbours watch' process 37 of entity 20S is arranged to build up a picture over time of its regular neighbours (devices which it regularly hears via its short-range transceiver) and to check, either periodically or when asked, if this set of neighbours has changed. This check can be carried out by triggering neighbours to send messages using their short range transceivers and this could be done by a signal sent over a LAN or other communications link and not necessarily just via the short-range transceivers; alternatively, entity 20S could send out a message via its short-range receiver asking recipients to respond by any available channel.

E—by detecting receipt of new location data that is inconsistent with the current location estimate and/or with previously received location data items (it then being assumed that the most recently received data has been, or could have been, received following displacement of the entity). This inconsistency check can be carried out as part of the operation of process 26D.

The detection of any of the above indications that the entity 20S may have been moved are passed to a location validity supervisor 32 of the location-validity checking arrangement. The supervisor then determines what action is to be taken and in doing so may adopt one or more of the following strategies (and variants and combinations of these strategies):

i)—Discard all currently-held location data (both location data items and any the current location estimate);

ii)—Temporarily block output of all location data (both the onward transmission of location data items and/or current location estimate and the output of the latter to the user) pending receipt of further indications or location data;

iii)—Disseminate/output location data but with a lowered confidence indication;

iv)—Check for another movement indicator.

One specific combination of the above strategies is described below with reference to the state transition diagram of FIG. 4; however, it is to be understood that many other possible strategy combinations are possible from simply discarding all location data upon a single move indication being detected, to requiring multiple indications of similar or different type of indication to be present together or in close time proximity.

Figure 4:
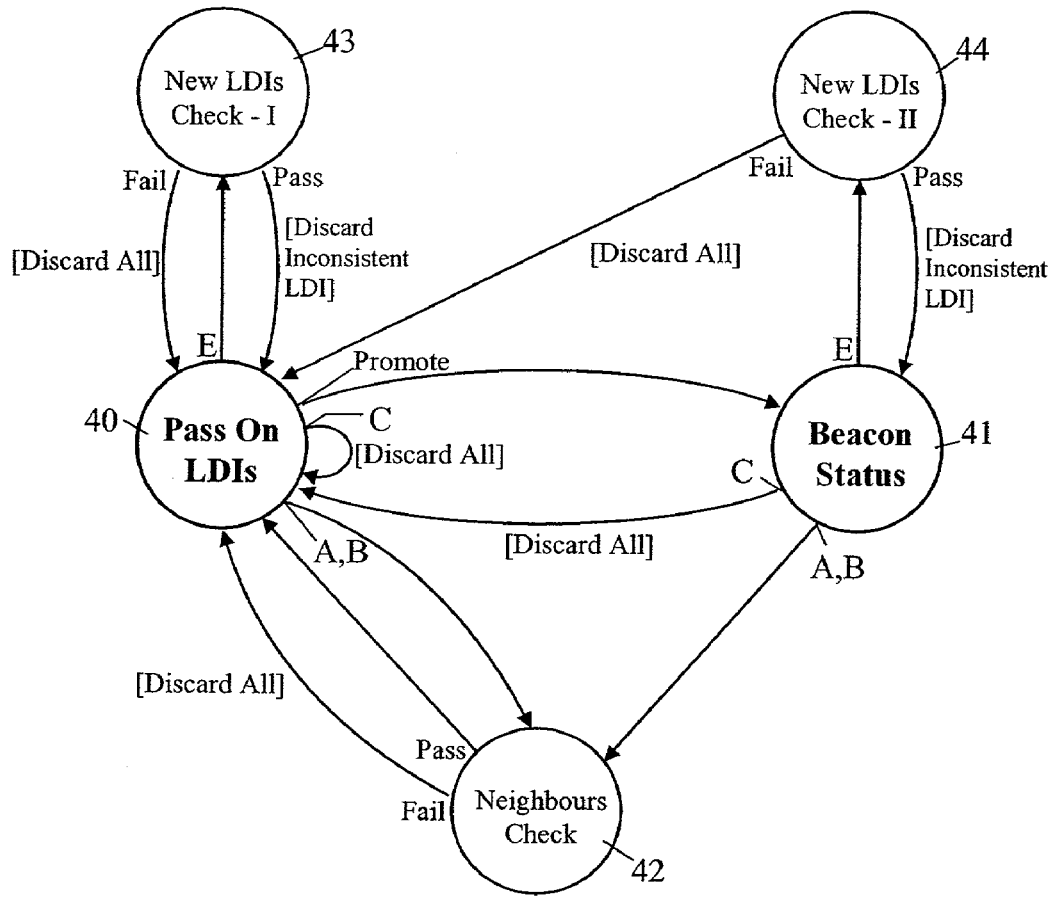
FIG. 4 is a state transition diagram illustrating location validation as carried out by the FIG. 3 entity.

In FIG. 4, the reference letters A, B, C, D, and E refer to the occurrence of indications of the corresponding forms listed above.

If an indication of type A (power-down/power-up) or type B (motion detection) is received whilst the entity 20S is in either of its main states 40 or 41, the entity is transited to a state 42 in which the supervisor causes the 'neighbors watch' process 37 to check to see if the set of neighbors has changed from the normal set. If this check is passed (neighbors are unchanged) the currently held location data is retained and the entity moves (or moves back) to state 40, losing any previously-held beacon status (until such time it is promoted again by process 30). If the check is failed, all location data is discarded and entity 20S reverts to state 40.

If an indication of type C (LAN segment change) is received, then all location data is discarded and the entity 20 reverts to state 40.

If an indication of type E (inconsistent new location data) is received whilst the entity 20S is in state 40, it transits to state 43 in which the output of location data (to the user or other devices) is temporarily blocked. In state 43, the entity awaits the receipt of additional new location data to be able to check whether this new data is consistent with its old location estimate—in the present example, two additional new location data items are required to be received and then if both are consistent with the old location estimate, the held location data is unblocked and the entity returns to state 40. however, if one or both of the additional newly received location data items is inconsistent with the old location estimate, all previously held location data is discarded and the entity returns to state 40. The location consistency checking is carried out by process 38.

If an indication of type E is received whilst the entity 20S is in state 41, it transits to state 44 where actions similar to those carried out in state 43 are effected. However, now if the next two location data items received are consistent with the old location estimate, the entity transit back to state 41; if one or both of the new items is inconsistent with the old location estimate, all previously held location data is discarded and the entity reverts to state 40.

Many variations are, of course, possible to the above-described embodiments of the invention. For example, whilst the data handling subsystem 22 is typically implemented as a program controlled processor for executing various processes, some or all of the functionality of the data handling subsystem could alternatively be effected by dedicated circuitry and, conversely, some of the functionality represented by the other elements of the entity 20S can be implemented by processes executed by the data handling subsystem 22.

The above-described location-validity supervision process can be applied to any static or semi-static device that is arranged to receive location data by short-range communication and use it to carry out one or more of the following tasks:
   pass on the received location data to other devices;
   estimate a current location of the device for output to a user;
   estimate a current location of the device and disseminate this location to other devices.

The location data carried by the location data items may comprise any location data appropriate for effecting location determination; thus the location data can be source location and a measure of displacement from the source, or source location and an age measure, or simply source location (which would be enough information to implement the location derivation method described in the first of our aforesaid patent applications).

What is claimed is:

1. A static but movable device, comprising:
   a short-range wireless receiver;
   a location-data processing arrangement for deriving successive estimates of the current location of the device using location data received on an on-going basis by the shortrange receiver;
   a move detection arrangement for detecting indications that the device at least may have been moved, and
   a location-validity supervisor for determining, following detection of one or more indications by the move detection arrangement, whether the current location estimate is to be treated as still valid, the location-data processing arrangement being arranged, in response to the location-validity supervisor determining that the current location estimate is invalid, to discard that location estimate as current and thereafter use subsequently-received location data to derive a new current location estimate, wherein the move detection arrangement comprises both a first detector arrangement for detecting a first said indication in the form of an indication that the device has physically been subject to motion, and a second detector arrangement for detecting a second said indication constituted by a change in the set of nearby devices from which the subject device can receive transmissions via its short-range receiver; the location-validity supervisor being responsive to the detection of a said first indication to query the second detector arrangement as to whether said second indication is present, the location-validity supervisor determining the current location estimate to be invalid when both said first and second indications are present.

2. A device according to claim 1, wherein the move detection arrangement comprises an arrangement for detecting a said indication in the form of an indication that the device has been powered down and then powered back up.

3. A device according to claim 1, wherein the move detection arrangement comprises an motion detector for detecting a said indication in the form of an indication of physical motion of the device.

4. A device according to claim 1, wherein the move detection arrangement comprises an arrangement for detecting a said indication in the form of a change in the set of nearby devices from which the subject device can receive transmissions via its short-range receiver.

5. A device according to claim 1, wherein the move detection arrangement comprises an arrangement for detecting a said indication in the form of an inconsistency between newly received location data and one or both of the current location estimate and previously-received location data.

6. A device according to claim 1, wherein the move detection arrangement comprises at least two of the following:
   an arrangement for detecting a said indication in the form of an indication that the device has been powered down and then powered back up;
   a motion detector for detecting a said indication in the form of an indication of physical motion of the device;
   an arrangement for detecting a said indication in the form of a change in the set of nearby devices from which the subject device can receive transmissions via its short-range receiver;
   an arrangement for detecting a said indication in the form of an inconsistency between newly received location data and one or both of the current location estimate and previously-received location data.

7. A device according to claim 1, wherein the location-validity supervisor is operative to determine that the current location estimate is invalid upon detection of one said indication by the move detection arrangement.

8. A device according to claim 1, wherein the move detection arrangement comprises both a first detector arrangement for detecting a first said indication in the form of an indication that the device has been powered down and then powered back up, and a second detector arrangement for detecting a second said indication constituted by a change in the set of nearby devices from which the subject device can receive transmissions via its shortrange receiver; the location-validity supervisor being responsive to the detection of a said first indication to query the second detector arrangement as to whether said second indication is present, the location-validity supervisor determining the current location estimate to be invalid when both said first and second indications are present.

9. A device according to claim 1, wherein the location-validity supervisor is operative to determine that the current location estimate is invalid upon detection of multiple occurrences of one type of indication.

10. A device according to claim 9, wherein the move detection arrangement comprises a consistency-check arrangement for detecting a said indication in the form of an inconsistency between newly received location data and one or both of the current location estimate and previously-received location data, the location-validity supervisor being operative to determine that the current location estimate is invalid upon detection of multiple occurrences of a said indication by the consistency-check arrangement.

11. A static but movable device comprising:
   a short-range wireless receiver;
   a location-data processing arrangement for deriving an estimate of the current location of the static but movable device on the basis of location data received by the short-range receiver; a neighbor-determination arrangement arranged to determined a set of nearby devices which the static but movable device can hear on its short-range wireless receiver on a regular basis;
   a move detection arrangement for detecting indications that the static but movable device at least may have been moved the move detection arrangement comprising a first detector arrangement for detecting a first said indication in the form of a change in the set of nearby devices from which the subject device can receive transmissions via its short-range receiver; the move detection arrangement comprising a first detector arrangement for detecting a first said indication in the form of a change in the set of nearby devices from which the subject device can receive transmissions via its short-range receiver, and a location-validity supervisor for determining, following detection of one or more indications by the move detection arrangement, whether the current location estimate is to be treated as still valid, the location-validity supervisor being arranged to effect this determination by prompting the devices in said set of nearby devices to transmit and then determining whether substantially all of the devices in said set of nearby devices can still be heard by the short-range wireless receiver of the static but movable device.

12. A device according to claim 11, wherein the move detection arrangement further comprises a second detector arrangement for detecting a second said indication in the form of an indication that the device has been powered down and then powered back up; the location-validity supervisor being responsive to the detection of a said second indication to query the first detector arrangement as to whether said first indication is present, the location-validity supervisor determining the current location estimate to be invalid when both said first and second indications are present.

13. A device according to claim 11, wherein the move detection arrangement further comprises a second detector arrangement for detecting a second said indication in the form of an indication that the device has physically been subject to motion; the location-validity supervisor being responsive to the detection of a said second indication to query the first detector arrangement as to whether said first indication is present, the location-validity supervisor determining the current location estimate to be invalid when both said first and second indications are present.

* * * * *